Jan. 26, 1960   H. A. KULJIAN   2,922,438
VALVELESS LIQUID FLOW CONTROL APPARATUS
Filed July 17, 1957   2 Sheets-Sheet 1

INVENTOR.
HARRY A. KULJIAN
BY
ATTORNEY.

Jan. 26, 1960     H. A. KULJIAN     2,922,438
VALVELESS LIQUID FLOW CONTROL APPARATUS
Filed July 17, 1957         2 Sheets-Sheet 2
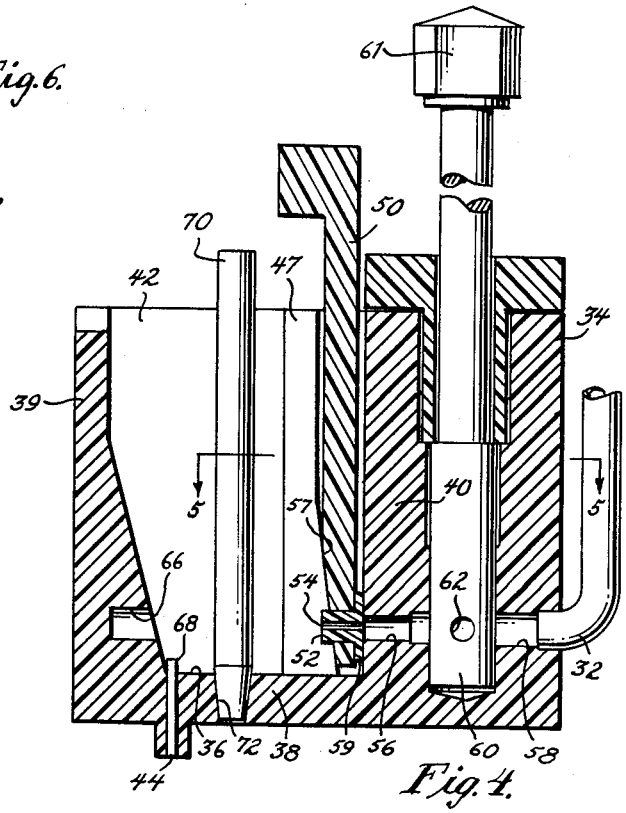
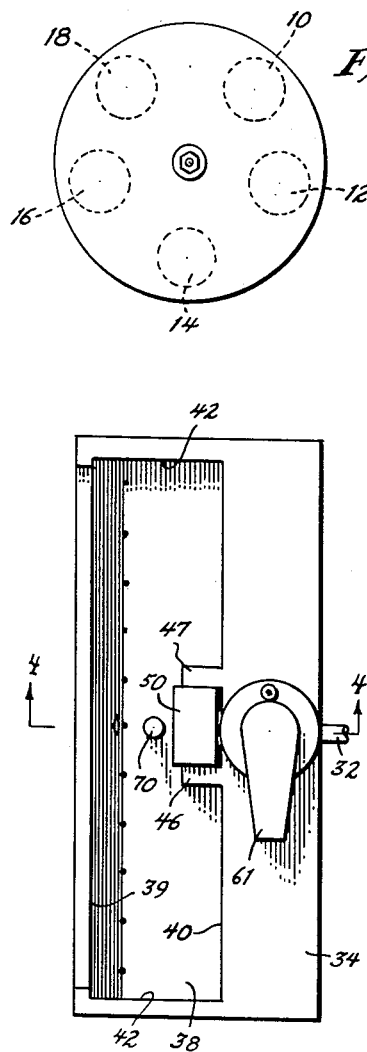
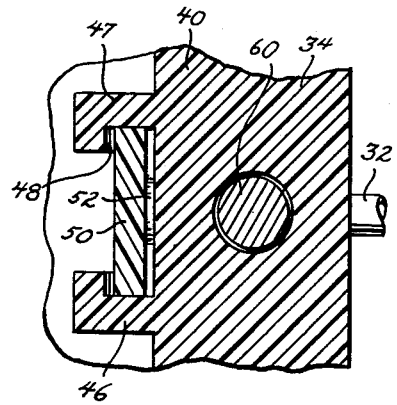
INVENTOR.
HARRY A. KULJIAN
BY
Louis Nechs
ATTORNEY.

United States Patent Office 2,922,438
Patented Jan. 26, 1960

2,922,438

VALVELESS LIQUID FLOW CONTROL APPARATUS

Harry A. Kuljian, Merion, Pa.

Application July 17, 1957, Serial No. 672,382

6 Claims. (Cl. 137—571)

My invention relates to a synthetic filament manufacturing, or treating apparatus of the type shown, for example, in my prior Patent No. 2,616,155.

The apparatus shown in that, and in several other patents issued to me, includes a reel over which the filament passes and means for applying the desired treating liquids to said filament to complete the regeneration of, or otherwise to process, the filament.

Extensive study and experimentation have shown that the uninterrupted, uniform, flow of treating liquids onto the filament are critical factors in determining the quality of the finished product, and it is therefore one object of the invention to produce an improved treating liquids dispensing means whereby constant and uniform flow of treating liquids onto the filament are assured.

A further object is to produce treating liquids dispensing means which is simple and inexpensive and which may be applied to any reel without in any way interfering with the structure or operation of the reel itself.

A still further object is to produce treating liquids dispensing means which is substantially fool proof and which is substantially free of maintenance costs.

A still further object is to produce treating liquids dispensing means which, in case of difficulty, can be repaired without interrupting the manufacturing process and without any interruption of the flow of the treating liquid such as will have any adverse effect on the quality of the filament.

These and other objects are attained by my invention as set forth in the following specification, and in the accompanying drawings in which:

Fig. 3 is a sectional view taken on line 3—3 on Fig. 2.

Fig. 4 is an enlarged vertical sectional view taken on line 4—4 on Fig. 3.

Fig. 5 is a sectional view looking in the direction of line 5—5 on Fig. 4.

Fig. 6 is a reduced diagrammatic end elevational view looking in the direction of line 6—6 on Fig. 1.

Figures 1, 2:
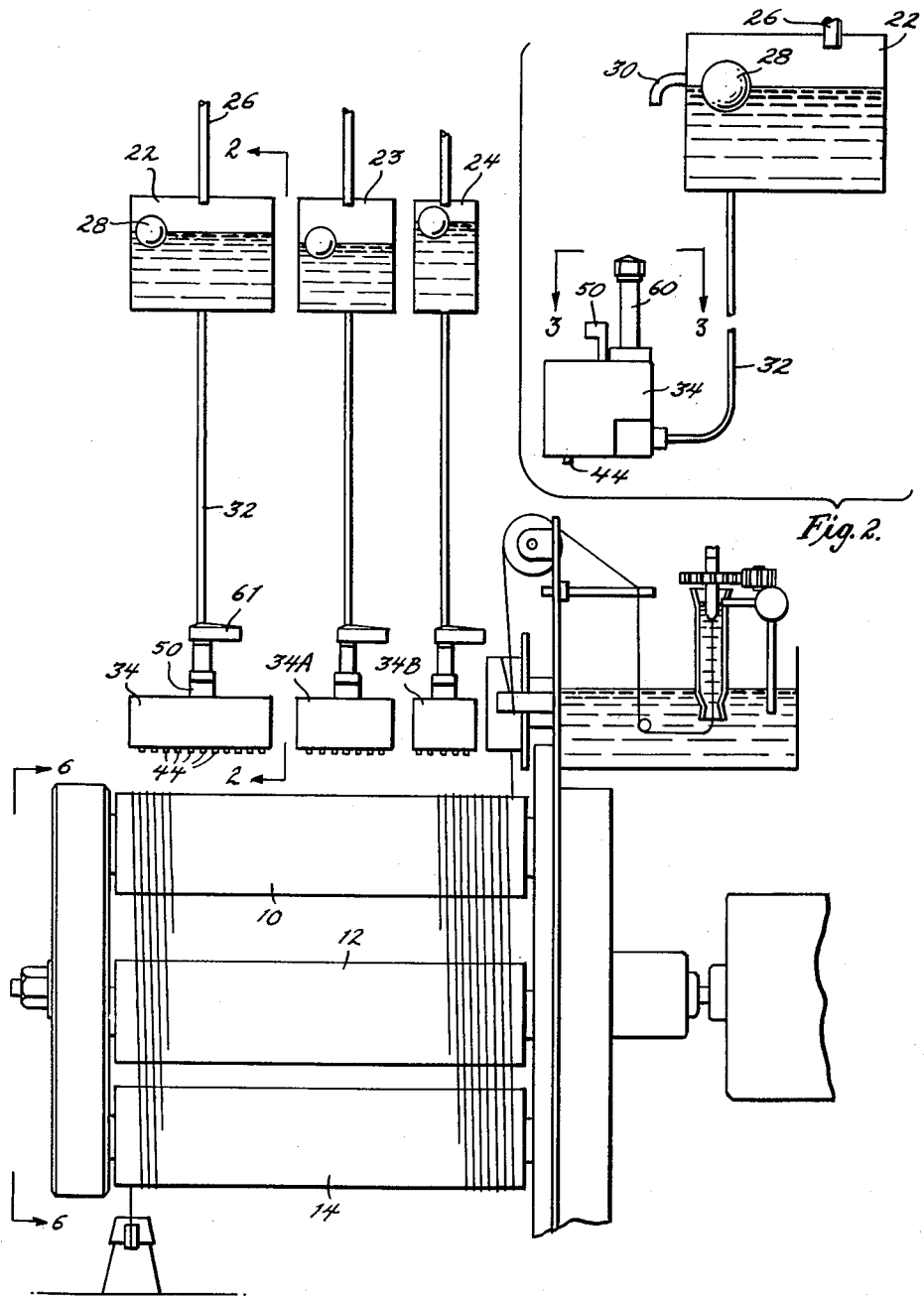
Fig. 1 is a highly fragmentary and diagrammatic side elevational view of a thread storing and advancing reel provided with treating liquids dispensing means embodying my invention, certain parts being omitted.
Fig. 2 is a highly fragmentary and diagrammatic end elevational view of the same looking in the direction of line 2—2 on Fig. 1.

The reel to which my treating liquid dispensing means is applied forms no part of the present invention, but, in order to make reference to prior patent unnecessary, it is pointed out that the reel is formed of a number of rolls 10, 12, 14, 16 and 18, which are arranged about a common central axis, the axis of one or more of the rolls being skewed relative to said central axis, as shown in Fig. 6 of my above mentioned patent, and said rolls being rotated about their respective axes whereby a filament laced about the feed, or right hand end of the reel, as viewed in Fig. 1, will move in the form of a helix encompassing all of said rolls to the delivery, or the left hand end of the reel. While the filament moves over one of the uppermost rolls, such as roll 10, treating liquids are poured over the filament to complete its regeneration or in order otherwise to process it.

The treating liquids dispensing apparatus of my invention includes a number of head tanks 22, 23 and 24, etc., for containing various treating liquids such as sulphuric acid, sodium carbonate, soap, etc., and individual means for delivering the various liquids to the filament as it moves over successive portions of the reel. Since the structure and operation of the tanks and of the means for delivering the various treating liquids to the filament are the same, the structure and operation of only one head tank 22 and the delivery means associated therewith for conducting the treating liquid from the head tank to the filament moving over roll 10 will be described.

As shown in Figs. 1 and 2 head tank 22 is supplied with a treating liquid by a pipe 26, which is connected to a reservoir, not shown. The level of the liquid in tank 22 may be controlled by means of a conventional float control 28 or by the provision of an overflow 30, which leads back to the reservoir, so as to insure a constant static pressure in the manner, and for the purpose hereinafter set forth. Head tank 22 is connected by pipe 32 to a spray head 34 and it will be seen from Fig. 1 that other spray heads 34A and 34B are similarly connected to corresponding head tanks, 23 and 24.

Spray head 34 includes a trough 36 formed of a bottom wall 38, side walls 39 and 40 and end walls 42 and is provided with a number of jets 44. It will be seen from Fig. 1 that the number of jets in the various spray heads varies according to the length of the zone over which the liquid in any given zone on roll 10 is to be discharged. Carried by, or formed integrally with, the iner side of wall 40 of trough 36, are vertical extensions 46 and 47 which are inturned as at 48 and which form a vertical pocket 48 for receiving a sluice gate 50 which is removably mounted in said pocket. The lower end of sluice gate 50 carries a bushing 52 which has a calibrated orifice 54 therein. When sluice gate 50 is in the position shown in Fig. 4, orifice 54 will register with a fixed passage 56 formed in the wall 40 of the trough. In order to make sluice gate 50 readily removable and still produce a water tight fit, the lower portion of the surfaces of extensions 46 and 47 are tapered as shown at 57 in Fig. 4 so that, when the sluice gate is placed in position, flange 59 on the right hand end of bushing 52 will make a substantially water tight seal with the surface of wall 40 which it abuts. It will be noted that passage 56 is much larger than orifice 54 and that the lower end of sluice gate 50 stops short of the bottom wall 38. This makes it possible to maintain orifice 54 in registration with passage 56 without the necessity of machining any of the parts involved to very close tolerances.

Passage 56 registers with port 58 to which liquid is delivered from head tank 20 by pipe 32 and between passage 56 and port 58 is a rotary valve 60 having a passage 62 which can be brought into, or out of, registration with passage 56 and port 58 to permit, or to stop, the flow of liquid into trough 36. In order to prevent splashing, the wall 39 of the trough is provided with a recess, or other baffle, 66 for dissipating the impact of the stream of liquid emanating from orifice 54. The intake ends 67 of the discharge outlets, or jets, are located above the bottom of trough 36 as at 68 to provide a sump in which the coarser particles of dirt may collect, thus reducing the danger of clogging jets 44. The dirt particles thus collected can be removed in any suitable manner, but I prefer to provide the bottom of the trough with a tapered opening which is closed by a tapered plug 70. When it is desired to clean out the trough, plug valve 70 can be pulled out momentarily and replaced.

The flow capacity of orifice 54 is so calibrated relative to the total flow capacity of the jets of the corresponding distributor as to insure a constant head in trough 36 and thus insure a constant flow of liquid from trough 36 onto the roll over which the filament being treated moves.

In calibrating orifice 54 relative to the corresponding jets, I take advantage of the fact that, other things being equal, the higher the static pressure in trough 36, the faster the flow of liquids from the trough will be. Therefore, I make the flow capacity of orifice 54 slightly greater than the flow capacity of all of the jets leading from said trough, so that, at the beginning of the operation, orifice 54 will deliver a little more liquid than is discharged through the jets. This builds up a head of liquid in trough 36 but, as the level of liquid in trough 36 rises, the rate of flow of liquid through the jets increases, and in a short time, a state of equilibrium is reached and the level of the liquid in trough 36 will be stabilized. The constant level of liquid in trough 36 insures constant flow of liquid onto the filament and this is true, within any reasonable limits, even when the jets are slightly clogged because, as the jets get clogged, the level of the liquid in trough 36 rises and the rate of flow through the jets increases.

By controlling the height of the liquid in head tank 22, I insure constant static pressure at the intake side of orifice 54 and, therefore, constant flow of liquid through orifice 54. Also, by this arrangement, valve 60 can be kept fully open, and it will need no attention on the part of the operator.

From the foregoing it will be seen that by merely positioning head tank 22 at the proper height and controlling the level of the liquid therein, and by calibrating orifice 54 relative to jets 44, the apparatus will operate wholly automatically and without the use of delicate or complicated controls, and that the only duty of the attendant is to see that jets 44 and orifice 54 are not clogged sufficiently to reduce the flow of liquid below the minimum necessary for proper treatment of the filament. It will also be seen that this involves no skill and that little effort is needed to poke a clogged jet or orifice 54 or to pull the sluice gate out and replace bushing 52 with another, or to pull out the sluice gate, poke orifice 54 and put the same sluice gate back in position. It is to be noted that the cleaning of a clogged jet, or the cleaning, or the replacement of orifice 54 is done so quickly that valve 60 can be left in full open position. In other words, as long as there is filament on the reel, valve 60 needs no attention whatever.

It will also be noted that, because each spray head has a number of jets, the temporary clogging of one or two of them will have no appreciable effect on the volume of treating liquid reaching the filament because the resultant rise in the level of the liquid in the particular trough increases the flow of liquid through the other orifices and in said trough thus compensates for the loss due to clogging of one or more of the jets. Temporary removal of sluice gate 50 for cleaning orifice 54 will only result in temporarily raising the level of the liquid in trough 36, and the resultant temporary increase in the flow of liquid through the jets and will not adversely affect the filament moving over roll 10.

It will also be seen from the foregoing that the flow of liquid through jets 44 is accurately controlled without the use of valves or other controls and by the simple expedient of providing constant static pressure on the intake side of orifice 54 and by merely calibrating orifice 54 relative to the total capacity of the corresponding jets.

What I claim is:

1. A valveless liquid flow control apparatus for dispensing liquid at a substantially uniform volumetric rate, said apparatus including a first trough adapted to receive a liquid, there being at least one liquid outlet opening leading from the lower portion of said trough, and a liquid inlet opening also leading into the lower portion of said trough above said outlet opening, a second trough above said first trough, a conduit leading from said second trough to said inlet, means for maintaining a first constant static pressure in said second trough to insure constant flow of liquid through said inlet opening, the rated flow capacity of said inlet opening being greater than the rated flow capacity of said outlet opening by an amount such that, with both openings operating at rated flow capacity, a static pressure of a relatively low order develops in said first trough and increases the rate of flow through said outlet opening to equalize the amounts of liquid flowing through both of said openings, and the depth of said first trough being such that a decrease in the flow capacity of said outlet opening will collect enough liquid in said first trough to provide a second static pressure of a higher order which is a function of the ratio of the flow capacity of said outlet to the flow capacity of said inlet to increase the rate of flow through said outlet opening and re-equalize the amount of liquid flowing through both of said openings.

2. The structure recited in claim 1, there being a vertically tapered recess in a wall of said second trough, an oppositely tapered member detachably insertable into said recess, and a bushing having a calibrated orifice therethrough and detachably carried by said member and adapted when said member is inserted into said recess, to register with, and to regulate the flow of liquid through said inlet into said first trough.

3. The structure recited in claim 2 in which a recess is formed in the wall of said first trough which is opposite said inlet opening to receive, and dissipate the kinetic energy of the liquid flowing into said first trough through said inlet opening.

4. The structure recited in claim 1 in which the bottom of said first trough is provided with a clean-out opening and a plug accessible from without said first trough for normally closing said clean-out opening, said clean-out opening being lower than said outlet openings.

5. The structure recited in claim 1 in which the receiving end of said outlet opening is above the bottom of said first trough.

6. The structure recited in claim 1 in which all of the parts of the first trough which come in contact with the liquid are acid and alkali proof.

References Cited in the file of this patent

UNITED STATES PATENTS

| | | |
|---|---|---|
| 667,947 | Morrison | Feb. 12, 1901 |
| 964,838 | Badger | July 19, 1910 |
| 1,387,760 | Bridges | Aug. 16, 1921 |
| 2,791,353 | Dorn et al. | May 7, 1957 |